United States Patent
Bodt et al.

(10) Patent No.: US 6,508,875 B1
(45) Date of Patent: *Jan. 21, 2003

(54) BITUMINOUS COMPOSITION

(75) Inventors: Duco Bodt, Amsterdam (NL); Gerardus Wilhelmus Jozef Heimerikx, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/911,486

(22) Filed: Aug. 14, 1997

(30) Foreign Application Priority Data

Aug. 16, 1996 (EP) .............................. 96306007

(51) Int. Cl.[7] .......................... C09D 4/00; C08L 95/00; C08L 9/00; B32B 11/00
(52) U.S. Cl. ............................... 106/273.11; 106/281.1; 524/571; 428/489
(58) Field of Search ........................... 428/489, 95, 96; 106/273.1, 278, 281.1; 524/571

(56) References Cited

U.S. PATENT DOCUMENTS

| | | | | |
|---|---|---|---|---|
| 3,231,635 A | * | 1/1966 | Holden et al. ............... | 260/880 |
| 3,251,905 A | * | 5/1966 | Zelinski ..................... | 260/879 |
| 3,390,207 A | * | 6/1968 | Moss et al. .................. | 260/879 |
| 3,594,452 A | * | 7/1971 | De La Mare et al. ....... | 260/880 |
| 3,598,887 A | * | 8/1971 | Darcy et al. ................. | 260/879 |
| 4,201,812 A | | 5/1980 | Blanken et al. .............. | 428/95 |
| 4,219,627 A | * | 8/1980 | Halasa et al. ................ | 525/89 |
| 4,530,652 A | * | 7/1985 | Buck et al. .................. | 428/291 |
| 5,191,024 A | * | 3/1993 | Shibata et al. ............... | 525/314 |
| 5,214,082 A | * | 5/1993 | Gelles et al. ................. | 524/68 |
| 5,346,964 A | * | 9/1994 | Shibata et al. ............... | 525/314 |
| 5,554,697 A | * | 9/1996 | Van Dijk et al. ............. | 525/314 |
| 5,601,642 A | * | 2/1997 | Drieskens et al. ........... | 106/273.1 |
| 5,798,401 A | * | 8/1998 | Korenstra et al. ............ | 524/68 |
| 5,854,335 A | | 12/1998 | Heimerikx et al. .......... | 524/571 |
| 6,120,913 A | * | 9/2000 | Kluttz et al. ................. | 428/521 |

FOREIGN PATENT DOCUMENTS

| | | |
|---|---|---|
| EP | 6674 | 1/1980 |
| EP | 641834 | 3/1995 |
| FR | 2307018 | 11/1976 |
| WO | 86/06736 | 11/1986 |

OTHER PUBLICATIONS

Patent Abstract of Japan; vol. 010, No. 245 (C–368), Aug. 22, 1986 & JP 61076539A (Nagoya Yuka Kogyo KK), Apr. 19, 1986.
EPC Search Report dated Jan. 12, 1998.
U.S. patent application Ser. No. 08/603,819, Heimerikx et al., filed Feb. 20,1996.

* cited by examiner

*Primary Examiner*—Holly Rickman

(57) ABSTRACT

The present invention provides a bituminous composition which comprises a bitumen component, less than 15% by weight of a block copolymer composition, based on total weight of block copolymer composition and bitumen component, and more than 40% by weight of a filler, based on total weight of block copolymer, bitumen component and filler, which block copolymer composition comprises at least one block of a conjugated diene and at least two blocks of a monovinylaromatic hydrocarbon, wherein the block copolymer composition has a vinyl content of at least 25% by weight based on the total diene content and optionally a diblock content of 25 wt % or less, and any diblock copolymer present has an apparent molecular weight which is in the range of from 60,000 to 170,000. The bituminous composition can be used in sound or vibration damping applications and/or in a backing layer for comprising a floor covering.

8 Claims, No Drawings

BITUMINOUS COMPOSITION

FIELD OF THE INVENTION

The present invention relates to a bituminous composition. In particular, the present invention relates to a bituminous composition for use in floor covering and/or sound or vibration damping applications.

BACKGROUND OF THE INVENTION

Bituminous compositions for use in sound or vibration damping applications are known in the art. A general overview is given in The SHELL Bitumen Industrial Handbook (1995) by P. Morgan and A. Mulder. An overview of sound and vibration damping is given in ASC Symposium Series (1989) Sound and Vibration Damping with Polymers by R. D. Corsaro and L. H. Sporling, editors.

One important sound or vibration damping application of bituminous compositions is in floor coverings. Floor coverings, e.g. carpets, carpet tiles, rugs etc., are known which comprise a fibrous material such as a woven or non-woven fabric. It is also known to provide certain floor coverings, especially those of the non-woven type e.g. felt or tufted floor coverings, with usually an integral backing layer to protect the floor covering against wear and to improve the dimensional stability thereof. It is important that the floor coverings provided with such backing layers are sufficiently flexible to prevent cracks forming in the backing layer during the transport, storage and laying thereof and are also, when in place on a floor, able to withstand heavy loads without the surface thereof remaining indented for an undesirable length of time after the heavy load has been removed.

For that purpose many backing layers nowadays comprise a polymer-modified bitumen component. In this respect reference can for instance be made to EP 0006674 B1 wherein the use has been described of a mixture containing a bitumen and a styrene-butadiene-styrene block copolymer for an integral backing layer of a fibrous floor covering. The amount of block copolymer to be used in such backing layers is, however, relatively high, making their use economically less attractive.

It would be desirable if economically attractive bituminous compositions could be provided for use in sound or vibration damping applications over a wide temperature range and/or a wide frequency range. It would further be desirable if bituminous compositions containing a relatively small amount of block copolymer could be provided for use as the backing layer of floor coverings.

SUMMARY OF THE INVENTION

Accordingly, the present invention provides a bituminous composition which comprises a bitumen component, less than 15% by weight of a block copolymer composition, based on total weight of block copolymer composition and bitumen component, and more than 40% by weight of a filler, based on total weight of the bitumen component, block copolymer composition, and filler, which block copolymer composition comprises at least one block of conjugated diene and at least two blocks of a monovinylaromatic hydrocarbon, wherein the block copolymer composition has a vinyl content of at least 25% by weight based on the total diene content and optionally a diblock content of 25 wt % or less, and any diblock copolymer present has an apparent molecular weight which is in the range of from 60,000 to 170,000.

With the term "apparent molecular weight" as used throughout the specification is meant the molecular weight of a polymer, as measured with gel permeation chromatography (GPC) using poly(styrene) calibration standards (according to ASTM D 3536).

By "diblock content", there should be understood the amount of non-coupled diblock copolymer that is finally present in the prepared block copolymer composition. Where the block copolymer is prepared via the full sequential preparation method, normally only triblock copolymers are formed. The triblock copolymers typically have an apparent molecular weight in the range from 120,000 to 340,000. The diblock content is preferably less than 20% wt, more preferably 15 wt % or less.

DETAILED DESCRIPTION OF THE INVENTION

The block copolymer composition constituents may be either linear or radial; good results have been obtained with both copolymer types. The block copolymer composition constituents include linear triblock copolymers (ABA), multi-armed block copolymers $((AB)_nX)$ and diblock copolymers (AB), with A representing a monovinyl aromatic hydrocarbon polymer block, B representing a conjugated diene polymer block, n being an integer of 2 or higher, preferably from 2 to 6 and X representing the residue of a coupling agent. The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma-glycidoxypropyl-trimethoxysilane and diglycidylether of bisphenol A.

The block copolymers, which are useful as modifiers in the bituminous compositions according to the present invention, may be prepared by any method known in the art including the well known full sequential polymerisation method, optionally in combination with reinitiation, and the coupling method, as illustrated in e.g. U.S. Pat. Nos. 3,231,635; 3,251,905; 3,390,207; 3,598,887 and 4,219,627 and EP 0413294 A2, 0387671 B1, 0636654 A1, WO 94/22931, which are herein incorporated by reference. The block copolymer may therefore, for example, be prepared by coupling at least two diblock copolymer molecules AB together.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxy-propane, 1-ethoxy-2,2-tert-butoxyethane, of which 1,2-diethoxypropane is most preferred.

The apparent molecular weight-of-diblock copolymer (AB) is in the range of from 60,000 to 170,000. Preferably, said diblock copolymer apparent molecular weight is in the range of from 60,000 to 130,000, more preferably from 70,000 to 120,000.

The content of monovinyl aromatic hydrocarbon of the final block copolymer is suitably in the range of from 10 to 55% by weight, preferably in the range of from 20 to 45% by weight, and more preferably 25 to 40% by weight, based on the total block copolymer. Suitable monovinyl aromatic hydrocarbons include styrene, o-methylstyrene, p-methylstyrene, p-tert-butylstyrene, 2,4-dimethylstyrene, α-methylstyrene, vinylnaphthalene., vinyltoluene and vinylxylene, or mixtures thereof of which styrene is the most preferred.

Suitable conjugated dienes include those having from 4 to 8 carbon atoms, for example 1,3-butadiene, 2-methyl-1,3-butadiene (isoprene), 2,3-dimethyl-1,3-butadiene, 1,3-pentadiene and 1,3-hexadiene. Mixture of such dienes may also be used. Preferred conjugated dienes are 1,3-butadiene and isoprene, with 1,3-butadiene being the most preferred.

The total vinyl content of the block copolymer is at least 25% by weight. Typically, the vinyl content is in the range of from 30 to 80% by weight, preferably from 35 to 65% by weight, more preferably from 35 to 55% by weight, even more preferably from 45 to 55% by weight, and most preferably from 50 to 55% by weight.

It will be appreciated that with the term "vinyl content" actually is meant that a conjugated diene is polymerised via 1,2-addition. Although a pure "vinyl" group is formed only in the case of 1,2 addition polymerisation of 1,3 butadiene, the effects of 1,2 addition polymerisation of other conjugated dienes on the found final properties of the block copolymer and the blends of it with bitumen will be the same.

The bitumen component may be a naturally occurring bitumen or derived from a mineral oil. Also petroleum pitches obtained by a cracking process and coal tar can be used as the bitumen component as well as blends of various bituminous materials. Examples of suitable components include distillation or "straight-run bitumens", precipitation bitumens, e.g. propane bitumens, blown bitumens, e.g. catalytically blown bitumen, and mixtures thereof. Other suitable bituminous components include mixtures of one or more of these bitumens with extenders (fluxes) such as petroleum extracts, e.g. aromatic extracts, distillates or residues, or with oils. Both compatible as well as incompatible bitumens may be used.

Typically, the bitumen component (either "straight-run bitumen" or "fluxed bitumen") is selected from those having a penetration of up to 350 dmm at 25° C. (as measured by ASTM D 5). Examples of bitumen components preferred for use in sound or vibration damping applications are those having a penetration of from 1 to 300 dmm at 25° C. Examples of bitumen components especially preferred for use in backing layers from floor coverings are those having a penetration of below 150 dmm at 25° C. More preferably, quite: hard bitumens having a penetration in the range of from 1 to 75 dmm are used.

The bituminous composition may also, optionally, contain other ingredients such as resins, oils, stabilisers, anti-statics or flame retardants. The content of such and other components may be in the range of from 0 to 10% by weight, based on total bituminous composition. Of course, other block copolymer compositions may also be included in the bituminous composition of the invention. Such block copolymer compositions can for instance be present in an amount of from 0 to 4% by weight, based on total weight of block copolymer composition and the bitumen component.

The bituminous composition may also comprise a wax. Suitable waxes are those having a congealing point of from 50 to 70° C. Suitable amounts of wax are from 0.1 to 75% w, preferably from 5 to 60% w based on the weight of bitumen present in the bituminous composition. Animal, insect, vegetable, synthetic and mineral waxes may be used with those derived from mineral oils being preferred. Examples of mineral oil waxes include bright stock slack wax, medium machine oil slack wax, high melting point waxes and microcrystalline waxes. In the case of slack waxes up to 25% w of oil may be present. Additives to increase the congealing point of the wax may also be present.

The block copolymer composition is present in the bituminous composition in an amount of less than 15% by weight, preferably in the range between 2 and 15% by weight based on total weight of block copolymer composition and the bitumen component.

If the bituminous composition is to be used in a backing layer, more preferably the block copolymer composition is present in the range from 2 to 10% by weight, even more preferably from 4 to 8% by weight, based on total weight of block copolymer composition and the bitumen component.

Examples of suitable fillers include talc, calcium carbonate, carbon black, fly ash, slate dust, limestone, dolomite and siliceous fillers, such as clay, mica and other sheet silicates. Mixtures of different fillers may be used. Preferably, calcium carbonate is used as filler. The amount of filler is more than 40% by weight, suitably less than 80% by weight, preferably of from 50 to 75% by weight, more preferably of from 60 to 70% by weight, based on total weight of block copolymer composition, bitumen component and filler. The bituminous composition may also be coloured by adding pigments thereto.

If desired, the bituminous composition may further comprise fibres, such as cellulose, glass and rock fibres. Typically, the bituminous composition may contain up to 25% by weight of fibres, based on the total composition.

According to a further aspect, the invention relates to use of the bituminous composition as described herein, in sound or vibration damping applications; to use of the bituminous composition as a backing layer for a floor covering; and to articles containing the bituminous composition.

The bituminous compositions according to the invention have a high temperature flow resistance, a good low-temperature flexibility, a high loss factor over a wide temperature range, and a high loss factor over a broad frequency range.

With high loss factor is meant a high loss modulus G" and/or a high loss tangent (tan δ). The loss tangent is defined as (loss modulus G"/storage modulus G').

According to one preferred embodiment, the article according to the invention is in the form of a backing layer.

The invention further relates to a floor covering having a backing layer as described herein.

The present bituminous compositions are particularly attractive for use as backing layer since they display a higher softening point and an equal or lower penetration when compared with. polymer-modified bituminous compositions from which conventional bitumen-containing backing layers are prepared. As a result thereof the floor coverings can more easily be cut into individual carpet tiles. Consequently, an improved dimensional stability can be achieved. The bituminous composition in accordance with the present invention has a penetration of less than 50 dmm, preferably in the range of from 1 to 20 dmm at 25° C.(as measured by ASTM D 5). Suitably, the bituminous composition has a softening point in the range of less than 150° C., preferably in the range of from 100 to 150° C. (as measured by ASTM D 36).

The present invention is particularly suitable for non-woven floor coverings such as felts or tufted floor coverings which may have been prepared by techniques such as needle punching into a backing which is usually a woven fabric. The floor covering may be composed of natural and/or synthetic fibres. In some cases it is conventional practice to provide the underside of the floor covering with a back coating the essential function of which is adhesive. This so-called primary coating is usually carried out with polymer in latex. The backing layer according to the present invention may be applied to the floor covering, which may or may not have been provided with a primary coating, by any convenient technique. Suitably the bituminous composition can be melted and the other components mixed therein and the resultant mixture, whilst still easy to handle, can then be applied to the floor covering by pouring and spreading the mixture onto the back of the floor covering or by passing the covering over a roller partly immersed in the mixture. Alternatively, the backing layer may be prepared as a separate layer and stuck or welded to the back of the floor covering.

The following Examples illustrate the present invention.

EXAMPLE 1

A bituminous composition in accordance with the present invention was prepared as follows.

94% by weight of a bitumen having a penetration of 50 dmm at 25° C. (as measured by ASTM D 5) and a softening point of 40° C. (as measured by ASTM D 36) was mixed at a temperature of 180° C. with 6% by weight of a block copolymer composition A. To 33 parts by weight of the mixture so obtained, 67 parts by weight of Calcifill 200 was added (a calcium carbonate filler ex-WIGRO; Calcifill is a trademark). Details of the block copolymer composition A are given in Table 1. The bituminous composition so obtained was then applied in molten state to the back of a tufted carpet to provide a backing layer having a thickness of 3 mm. The tufted carpet so obtained showed attractive flexibility characteristics. The main properties of the bituminous composition are shown in Table 2.

EXAMPLE 2

A bituminous composition in accordance with the present invention was prepared in a similar manner as described in Example 1 except that now 8% by weight of a block copolymer composition B and 92% by weight of the bitumen was applied. Details of block copolymer composition B are given in Table 1. The tufted carpet obtained showed a substantially similar flexibility when compared with the tufted carpet obtained in Example 1. The main properties of the bituminous composition are shown in Table 2.

Comparative Example 3

For reasons of comparison a bituminous composition was prepared in a similar manner as described in Example 1 except that now 90% by weight of the bitumen and 10% by weight of a block copolymer composition C was applied. Details of block copolymer composition C are given in Table 1. The tufted carpet obtained showed substantially similar flexibility when compared with the tufted carpet obtained in Example 1. The main properties of the bituminous composition are shown in Table 2.

TABLE 1

| Polymer of Ex. No. | Polystyrene (%)[1] | Vinyl (%)[2] | Diblock (Mw) kg/mol[3] | Final (MW) kg/mol[3] | coupling efficiency (%)[4] |
|---|---|---|---|---|---|
| A | 30 | 50 | 120 | 415 | 92 |
| B | 30 | 49 | 81 | 282 | 88 |
| C | 31 | 10 | 89 | 165 | 83 |

[1]ASTM D3314
[2]As determined by infrared spectroscopy, generically described in ASTM D 3677
[3]ASTM D 3536 as detected by UV absorption
[4]The weight ratio of amount of material formed by coupling to the total amount of 'living' diblock present before coupling.

TABLE 2

| Example No. | 1 | 2 | 3 |
|---|---|---|---|
| Polymer | A | B | C |
| Polymer content[1] (%) | 6 | 8 | 10 |
| Calcifill 200[2] (%) | 67 | 67 | 67 |
| Softening point (° C.) | 144 | 128.5 | 129 |
| Penetration, 25° C. (dmm) | 11 | 10 | 11 |

[1]Polymer content on total polymer/bitumen.
[2]Filler content on total polymer/bitumen/filler.

It will be clear from the above that the backing layer according to the present invention (Examples 1 and 2) can contain a substantially smaller amount of block copolymer composition when compared with a conventional poly-modified bitumen-containing backing layer (Example 3), whilst a similar or improved performance can be established.

EXAMPLE 4

A bituminous composition in accordance with the present invention was prepared as follows.

92% by weight of a bituminous component having a penetration of 180 dmm at 25° C. (as measured by ASTM D 5) and an estimated softening point of 38° C., was mixed at a temperature of 180° C. with 8% by weight of block copolymer composition A. To 35 parts by weight of the mixture so obtained 65 parts by weight of Calcifill 200 was added (a filler ex-WIGRO; Calcifill is a trademark). Details of the block copolymer composition A are given in Table 1. The properties of the bituminous composition relevant for sound or vibration damping applications, are listed in Table 3.

Comparative Example 5

The experiment described in Example 4 was repeated, but using block copolymer composition C, having a vinyl content of less than 10%. Details of the block copolymer composition C are given in Table 1. The properties of the bituminous composition relevant for sound or vibration damping applications, are listed in Table 3.

TABLE 3

| Example No. | 4 | 5 |
|---|---|---|
| Polymer | A | C |
| Softening point (° C.) | 122.5 | 100.5 |
| Penetration, 25° C. (dmm) | 25 | 18 |
| Viscosity at 180° C. | | |
| Shear rate 20 sec.$^{-1}$ | 6.6 | 3.9 |

TABLE 3-continued

| Example No. | 4 | 5 |
|---|---|---|
| Shear rate 100 sec.$^{-1}$ | 6.5 | 4.0 |
| Cold Bend - Pass (° C.) | −5 | −5 |
| DIN Flow - Pass (° C.) | 105 | 70 |
| tan (δ) at 200 Hz, −10° C. | 0.14 | 0.13 |
| 5° C. | 0.39 | 0.52 |
| 20° C. | 0.82 | 0.80 |
| 80° C. | 1.12 | 1.84 |
| Loss Modulus G" at 200 Hz, −10° C. | $1.66 * 10^8$ | $1.4 * 10^8$ |
| 5° C. | $1.68 * 10^8$ | $1.14 * 10^8$ |
| 20° C. | $6.52 * 10^7$ | $4.78 * 10^7$ |
| 80° C. | $1.48 * 10^3$ | $1.33 * 10^3$ |

As can be seen from Table 3, the physical properties, in particular the softening point, of bituminous compositions according to the invention are much better than of bituminous compositions having a lower vinyl content, not according to the invention, whilst excellent sound damping properties have been retained.

We claim:

1. A bituminous composition comprising a bitumen component, less than 15% by weight of a block copolymer composition, based on total weight of block copolymer composition and bitumen component, and more than 40% by weight of a filler, based on total weight of the block copolymer composition, bitumen component, and filler, which block copolymer composition comprises at least one block of a conjugated diene and at least two blocks of a monovinylaromatic hydrocarbon, wherein the block copolymer composition has a vinyl content of at least 25% by weight based on the total diene content and a diblock content of 25 wt % or less, and any diblock copolymer present has an apparent molecular weight which is in the range of from 60,000 to 170,000.

2. A bituminous composition as claimed in claim 1, wherein the block copolymer composition has a vinyl content in the range of from 35 to 65% by weight.

3. A bituminous composition as claimed in claim 2, wherein the block copolymer composition has a vinyl content in the range of from 35 to 55% by weight.

4. A bituminous composition as claimed in claim 1, wherein any diblock copolymer present has an apparent molecular weight in the range of from 60,000 to 130,000.

5. A bituminous composition as claimed in claim 1, wherein the block copolymer composition is present in an amount in the range of between 2 and 15% by weight, based on total weight of block copolymer composition and the bitumen component.

6. A bituminous composition according to claim 1, wherein the bitumen component has a penetration in the range of from 1 to 300 dmm at 25° C. (as measured by ASTM D 5).

7. A bituminous composition according to claim 1, wherein the filler is present in an amount in the range of 50 to 70% by weight, based on total weight of block copolymer composition, bitumen component, and filler.

8. A floor covering having a backing layer which is comprised of the bituminous composition of claim 1.

* * * * *